United States Patent [19]
De Lange et al.

[11] Patent Number: 5,809,147
[45] Date of Patent: Sep. 15, 1998

[54] DEVICE FOR CRYPTOGRAPHICALLY PROCESSING DATA PACKETS AND METHOD OF GENERATING CRYPTOGRAPHIC PROCESSING DATA

[75] Inventors: Martin Klaas De Lange, Voorburg; Jean Paul Boly, Zoeterwoude, both of Netherlands

[73] Assignee: Koninklijke PTT Nederland, Netherlands

[21] Appl. No.: 911,543

[22] Filed: Aug. 14, 1997

Related U.S. Application Data

[63] Continuation of Ser. No. 405,805, Mar. 16, 1995, abandoned.

[30] Foreign Application Priority Data

Mar. 18, 1994 [NL] Netherlands ............................ 9400428

[51] Int. Cl.$^6$ ................................ H04L 9/00; H04K 1/00
[52] U.S. Cl. ............................... 380/28; 380/29; 380/44; 380/21; 380/49
[58] Field of Search ................................ 380/28, 29, 44, 380/21, 49

[56] References Cited

U.S. PATENT DOCUMENTS

| | | | |
|---|---|---|---|
| 4,159,468 | 6/1979 | Barnes et al. | 340/146.1 |
| 4,160,120 | 7/1979 | Barnes et al. | 380/28 |
| 4,471,164 | 9/1984 | Henry | 380/42 |
| 4,791,669 | 12/1988 | Kage | 380/46 |
| 4,815,130 | 3/1989 | Lee et al. | 380/50 |
| 4,972,481 | 11/1990 | Santesson | 380/49 |
| 5,016,275 | 5/1991 | Smith | 380/43 |
| 5,048,087 | 9/1991 | Trbovich et al. | 380/43 |
| 5,195,136 | 3/1993 | Hardy et al. | 380/43 |
| 5,365,588 | 11/1994 | Bianco et al. | 380/42 |
| 5,381,480 | 1/1995 | Butter et al. | 380/37 |
| 5,425,103 | 6/1995 | Shaw | 380/44 |
| 5,442,705 | 8/1995 | Miyano | 380/29 |
| 5,483,598 | 1/1996 | Kaufman et al. | 380/43 |
| 5,619,576 | 4/1997 | Shaw | 380/44 |

FOREIGN PATENT DOCUMENTS

| | | |
|---|---|---|
| 0227318 | 7/1987 | European Pat. Off. . |
| 0366288 | 5/1990 | European Pat. Off. . |
| WO8707796 | 12/1987 | WIPO . |

OTHER PUBLICATIONS

Diffie et al., "Privacy and Authentication: An Introduction to Cryptography", 8078, Proceedings IEEE, vol. 67, No. 3 (Mar. 1979) pp. 397–427.

"Identification card systems—Telecommunications integrated circuit(s) card and terminals—Part 2—Security Framework", European Telecommunications Standard Institute, prEN 726–2, Version: 11, Apr. 1994.

"Applied Cryptography," 2nd Ed. ©1996, by Bruce Schneier. pp. 270–278.

Primary Examiner—Thomas H. Tarcza
Assistant Examiner—Hrayr A. Sayadian
Attorney, Agent, or Firm—Michaelson & Wallace; Peter L. Michaelson; John C. Pokotylo

[57] ABSTRACT

A device for encrypting or decrypting data packets. The device includes two cryptographic elements. The first cryptographic element generates processing data, based on a first starting value, for use in cryptographically processing the data packet. The second cryptographic element is arranged to generate the first starting value based on a second starting value. The second starting value is based on a previously cryptographically processed data packet.

27 Claims, 4 Drawing Sheets

DEVICE FOR CRYPTOGRAPHICALLY PROCESSING DATA PACKETS AND METHOD OF GENERATING CRYPTOGRAPHIC PROCESSING DATA

CROSS REFERENCE TO RELATED APPLICATIONS

This application is a continuation of U.S. patent application Ser. No. 08/405,805, filed on Mar. 16, 1995 and entitled "Device for Cryptographically Processing Data Packets, and Method of Generating Cryptographic Processing Data," now abandoned. Priority is claimed under 35 U.S.C. § 120.

BACKGROUND OF THE INVENTION

The invention relates to a device for processing data packets. The device includes buffer means for temporarily storing data packets, identification means for identifying data packets, processing means for cryptographically processing data packets and memory means for storing cryptographic information. Such a device is disclosed in the U.S. Pat. No. 5,048,087 (Trbovich et al.).

In the known device, a key and a cryptographic value are stored in a memory for each channel (or virtual connection). The cryptographic value is the final value (cryptographic residue) of the cryptographic process used after carrying out a cryptographic processing on a data packet. In this method, the final value, that is, the state (state vector) after the processing steps are carried out, is stored in the memory as starting value (initialization vector) for a subsequent data packet of the channel. This repeated use of the final value as new starting value is disadvantageous because the cryptographic security is relatively small. More specifically, because (for a particular channel) a large number of successive states of the cryptographic process concerned are traversed, a cyclic repetition of the states may occur. Furthermore, the device according to the prior art has the disadvantage that, if one or more data packets are lost, the synchronization between encrypting and decrypting device will be lost as well. Thus, the loss of, for example, one data packet on the data connection will always result in the state of the preceding packet being used in the decrypting device for the initialization of the cryptographic function (cryptographic process). Consequently, the "decrypted" data packets will be unrecognizably garbled in most cases.

SUMMARY OF THE INVENTION

The object of the invention is to eliminate the above mentioned disadvantages and other disadvantages of the prior art and to provide a device which offers both a very high cryptographic security and, independent of the cryptographic process used, ensures synchronization of encrypting and decrypting devices, even if a plurality of data packets are lost.

In addition, the object of the invention is to provide a device for cryptographically processing data packets which is suitable for high data rates, such as the data rate handled in asynchronous transfer mode (or "ATM") of approximately 155 Mbit/s.

For this purpose, in the device according to the invention, the processing means comprise a first and a second cryptographic element. The first cryptographic element is designed for generating, based on a first starting value, processing data for the cryptographic processing of a data packet. The second cryptographic element is designed for generating, based on a second starting value, the first starting value. The processing means are designed for forming the second starting value based on a cryptographically processed data packet.

Because the processing means comprise a first and a second cryptographic element and the second cryptographic element provides the starting value of the first element, a very high cryptographic strength can be achieved since the starting values of the first cryptographic element are virtually independent of the preceding final values. In addition, it is possible in this way to design the two elements in a cryptographically simpler way than a comparable single element. Consequently, first, higher processing rates and, secondly, smaller states (state vectors, such as starting and final values) are possible. The smaller starting and final values can, in turn, be retrieved or stored more quickly, and this results in a further increase in rate.

The two cryptographic elements may carry out different cryptographic processes, possibly with different complexities. With a constant cryptographic strength of the device, the complexities of the elements are essentially complementary. According to a preferred embodiment of the invention, however, the cryptographic elements are identical, that is, they carry out identical cryptographic processes.

Advantageously, the processing means are designed for interchanging the functions of the first cryptographic element and the second cryptographic element. As a result, it is not necessary to transfer starting or final values of one cryptographic element to the other. Hence, processing of very rapidly succeeding data packets is possible.

In a preferred embodiment, at least one cryptographic element is provided with plural registers. With the aid of two or more registers per cryptographic element, it is possible to carry out a cryptographic processing, such as the generation of a new final value, on the content of a first register, while at least one other register remains available for temporarily storing a value generated earlier or to be used later, and therefore functions as a buffer. In this case, the registers are advantageously designed for copying the content of a register to another register. In the case of parallel copying, in particular, a rapid transfer of the values to the various registers is therefore possible. Consequently, the processing means can shift rapidly to the generation of new values.

The device according to the invention is preferably accommodated in an application-specific integrated circuit (ASIC).

The invention furthermore provides a method of generating cryptographic processing data. The method performs a first cryptographic processing on a first starting value. A final value of the first cryptographic processing is used as processing data. A second cryptographic processing is performed on a second starting value. A final value of the second cryptographic processing is used as first starting value for the first cryptographic processing. The second starting value is formed based on data which have been combined with processing data. Preferably, the second starting value is also formed based on a key.

REFERENCES

[1] W. Diffie & M. E. Hellman: "Privacy and Authentication: An Introduction to Cryptography", Proceedings of the IEEE, Vol. 67, No. 3, March 1979
[2] EP-A-0,227,318
[3] U.S. Pat. No. 5,048,087
[4] NL-A-93,01841 & PCT/EP94/03482
[5] WO-A-87,07796
[6] EP-A-0,366,288

[7] National Bureau of Standards, "Data Encryption Standard, Federal Information Processing Standard, Publication 46, U.S. Dept. of Commerce, January 1977.
[8] Tesa-7, pr. EN 726-2, "Terminal Equipment (TE); Requirements for IC Cards and Terminals for Telecommunication Use—Part 2: Security Framework".

The above references are herewith incorporated in this text.

BRIEF DESCRIPTION OF THE DRAWINGS

The invention will be explained in greater detail below by reference to the figures.

DETAILED DESCRIPTION OF PREFERRED EMBODIMENTS

Figure 1:
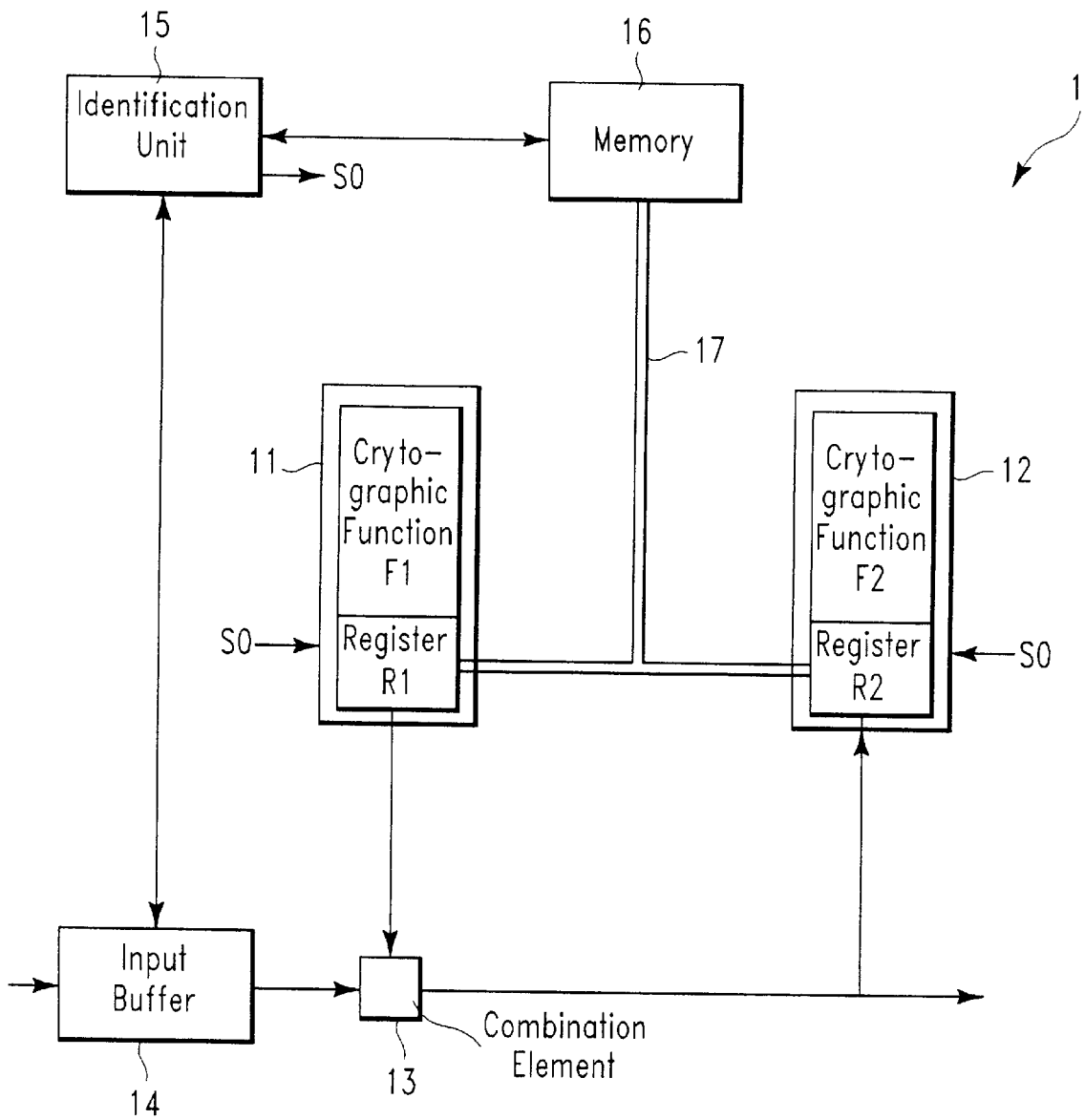
FIG. 1 shows diagrammatically a first embodiment of the device according to the invention.

In the encrypting device 1 according to the invention shown diagrammatically and by way of example in FIG. 1, the processing means comprise a first cryptographic element 11, a second cryptographic element 12 and a combination element 13. The buffer means are formed by an input buffer 14. The input buffer 14 is coupled to an identification unit 15, which forms the identification means. The memory means comprise a memory 16 which is connected to the first cryptographic element 11 and the second cryptographic element 12 by means of a data bus 17. In the embodiment shown, the device is controlled by the identification unit 15, which emits suitable control signals (for example S0) for this purpose. Possibly, however, a separate control unit may be provided. Furthermore, if necessary, an output buffer connected to the combination element 13 may be provided (not shown).

A data packet which arrives in the device 1 is temporarily stored in the input buffer 14 until the identification unit 15 has identified the data packet and the processing means are ready to process the data packet. The identification of a data packet comprises determining the (logical) channel of the data packet, "channel" also being understood here to mean a virtual path or connection of a different type, possibly virtual. In the case of ATM, for example, the identification unit 15 determines the virtual channel or the virtual connection based on the "virtual channel identifier" (VCI) or the "virtual path identifier" (VPI), that is, based on information present in the header of the data packet. For this purpose, the header of the data packet may be copied from the input buffer 14 to the identification unit 15. In addition to determining the channel, further information may, if necessary, be derived both from the header and from the data field of the data packet.

If the data packet is identified, processing information is read out of the memory 16, for example information which specifies whether data packets of the channel concerned have to be encrypted, decrypted or not processed at all. If a processing of the data packet is necessary, a corresponding key may be read out of the memory 16 based on the (channel) identification. A separate memory (not shown) may also be provided for storing keys.

The processing, in the present case encrypting, of a data packet takes place as follows. A starting value (starting vector) associated with the channel concerned, is loaded into the cryptographic element 11 from the memory 16. For this purpose, the element 11 can be conceived as divided up functionally into a register R1 and a cryptographic function F1. The register R1 may comprise memory elements, such as flip-flops. The function F1, which is embodied, for example, by a microprocessor and a memory, calculates, in a number of steps, a new cryptographic value (final value) from the starting value. Preferably, like the final value, the starting value has a length of 256 bits, and the function carries out 48 steps (corresponding to the 48 data bytes of an ATM packet), which successively yields 48 states having associated state vectors (intermediate values). One byte (octet) is successively extracted from each state of 256 bits, which byte forms the "running key" of a corresponding data byte of the data packet. In the combination element 13, the bytes of the running key ("processing bytes") are combined with the data bytes of the data packet. Preferably, this takes place by addition modulo 2 of the corresponding bits, but other operations, such as multiplication, are also possible in principle.

The processing element 11 is preferably designed so that the header of a data packet is not changed. In the case of the bytes of the header for example, this can readily be achieved by modulo 2 addition of processing bytes which comprise only zeros. For this purpose, the identification unit 15 (or, if present, a separate control unit) activates the cryptographic element 11 or the combination element 13 by supplying suitable control signals (for example, S0).

The values of the first eight processed (encrypted) bytes emitted by the combination element 13 are copied to the cryptographic element 12 and stored in a register R2 present. In this connection, the register R2 may be constructed from memory elements, such as flip-flops, possibly interlaced with the function F2. In the element 12, the stored 64 bits are placed one after the other in a total of four copies, which results in a number having a length of 256 bits. For the number, the key of the channel concerned, which also has a length of 256 bits, is added modulo 2. The resulting number functions as starting value (starting vector) for the cryptographic function F2. The final value (final vector) of the crytographic function F2, which is stored in the memory 16 and will be used for the function F1 as starting value for the subsequent data packet of the channel concerned, is then calculated in, preferably, 40 steps.

By using only a limited number of bytes, such as the above mentioned first eight bytes, of each processed data packet instead of, for example, all 48 data bytes of an ATM data packet for forming a starting value, the formation of a new starting value can be started even during the processing of the data packet. It will be clear that the processing rate of the device can be higher as a result of this.

In the device according to the invention, therefore, data of a processed data packet, preferably combined with a key, is used to provide the starting value of a cryptographic process. The final value of the process is used as starting value of another process which generates the running key for the encryption or decryption. In the embodiment shown, a data packet is always encrypted based on a starting value which, in turn, is determined based on the preceding data packet of that channel. Consequently, a minimum number of data packets is incorrectly decrypted in the event of the loss of a data packet at the receiving end. The device according to the invention may also, however, be constructed so that the encrypting of a data packet is determined, not as a function of the last data packet of that channel, but rather, as a function of, for example, the penultimate data packet, so that one data packet is passed over. A plurality of data packets may possibly be passed over. In principle, the starting value of the encrypting process can also be based on an earlier data packet of another channel, for example the last data packet encrypted by the device. However, this results in a certain degree of mutual dependence of the channels, which is generally cryptographically undesirable.

In the processing means shown, a combination element 13 is present for combining, for example, a bit stream to be encrypted with an encrypting bit stream. Such a combination element may be formed, for example, by an exclusive-OR gate. It is also possible, however, to construct the processing means such that the cryptographic process of the cryptographic element 11 acts directly on the data of a data packet and does not therefore produce a separate running key. In that case, the separate combination element 13 can be omitted.

The actual cryptographic process used in the cryptographic elements 11 and 12 is, in principle, arbitrary, as long as it produces a cryptographical value based on a starting value. Suitable processes are e.g., the well-known Data Encryption Standard (or "DES") algorithm (reference 7) and the Rivest-Shadler-Adleman or ("RSA") algorithm. See also reference 1.

The device 1 of FIG. 1 may be constructed from discrete, commercially available components, but is preferably accommodated, at least partly, in an application-specific integrated circuit (ASIC). The device 1 is suitable not only for rapidly encrypting ATM data packets, but also for processing data packets which are transferred in accordance with other protocols, such as X.25. It will be clear that the given numerical values such as the number of bits in a key, the number of steps of a cryptographic process and the number of bytes to be encrypted, may vary as a function of the specific application or implementation and are given here only by way of example. Although the invention is described here by reference to the processing of data packets, the inventive idea can be used just as well in the processing of data streams not consisting of data packets.

Figure 2:
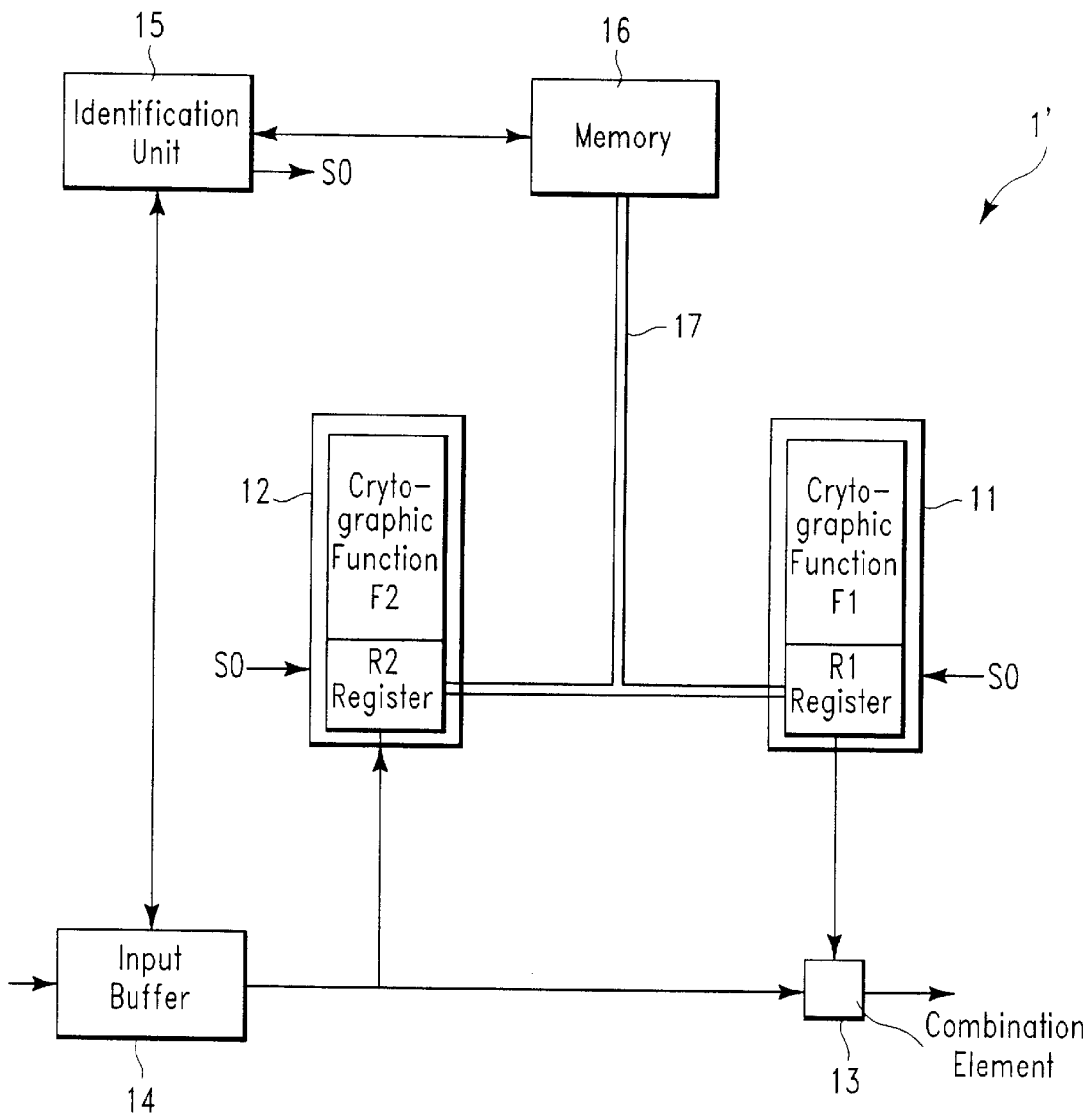
FIG. 2 shows diagrammatically a second embodiment of the device according to the invention.

The device 1' according to the invention shown diagrammatically in FIG. 2 largely corresponds to the device 1 of FIG. 1, but is adapted for the decrypting of data packets. The device 2 also comprises a first cryptographic element 11, a second cryptographic element 12, a combination element 13, an input buffer 14, an identification unit 15, a memory 16, and a data bus 17. In contrast to FIG. 1, the positions of the elements 11 and 12 are interchanged in FIG. 2. That is, the element 12 is connected to the input buffer 14 and the combination element 13, so that the contents of encrypted data packets are supplied to the element 12. It will be clear that the input buffer 14 of the device 2 receives encrypted data packets and that the data packets are decrypted in the combination element 13, if appropriate for the channel concerned. The decryption takes place by combining the data of a data packet with a running key. In the case where the data have been encrypted by the addition modulo 2 of a running key, the decryption takes place by the addition modulo 2 of an identical running key.

Figure 3:
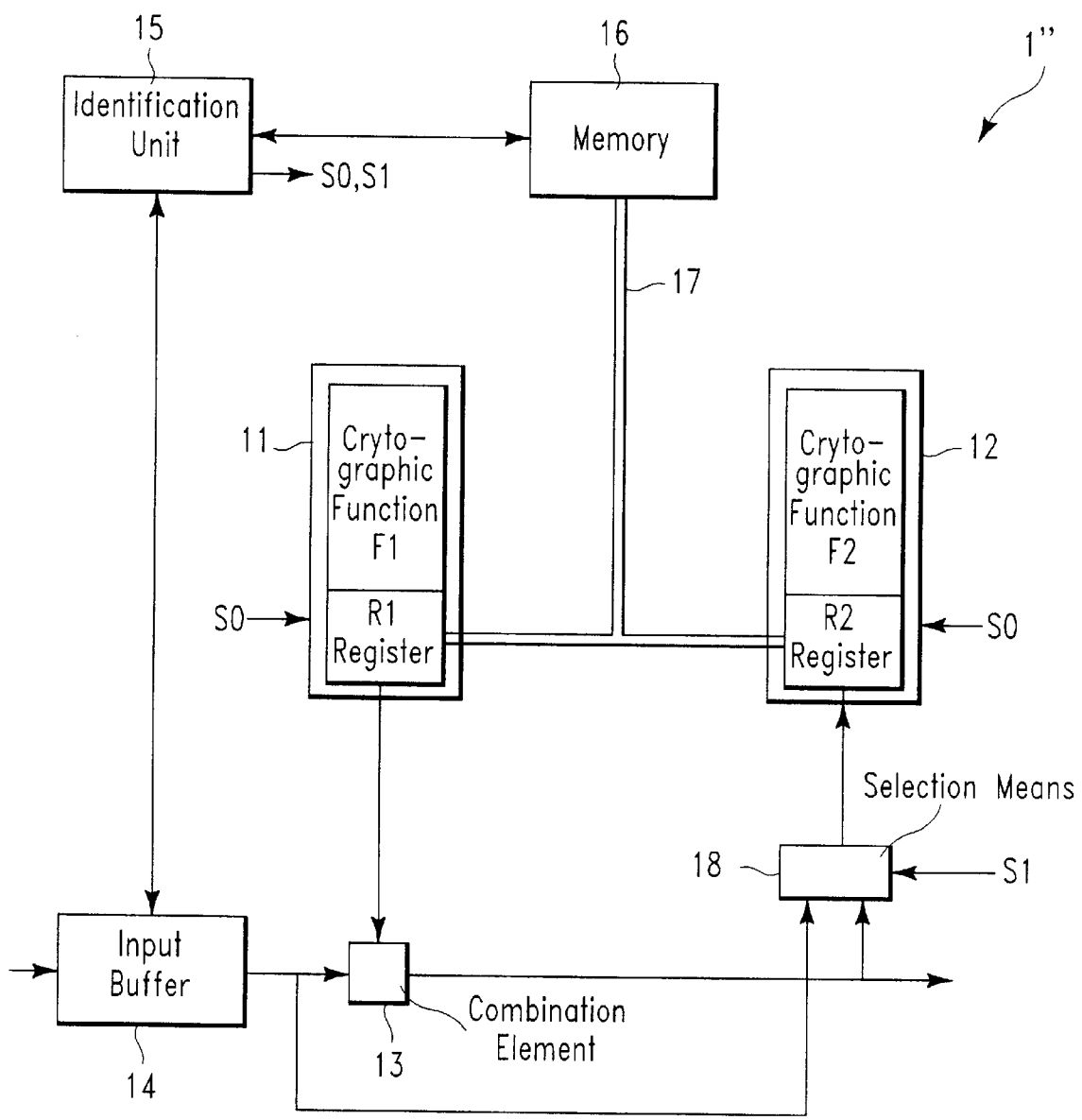
FIG. 3 shows diagrammatically a third embodiment of the device according to the invention.

FIG. 3 shows a device according to the invention which is suitable for both encryption and decryption. The device 1" of FIG. 3 largely corresponds to the devices 1 and 1', respectively, of FIG. 1 and 2. As a departure from FIGS. 1 and 2, however, selection means 18 are provided between the cryptographic element 12, on the one hand, and the outputs of the combination element 13 and the input buffer 14, on the other. The supplying of a selection signal S1 to the selection means 18, which may be constructed, for example, of AND gates, connects either the output of the buffer 14 (decryption), or the output of the combination element 13 (encryption) to the cryptographic element 12. The selection signal S1 can be generated either by the identification unit 15 (or a control unit coupled thereto), for example in response to the identification of a channel, or by external means, such as a selection switch (not shown).

In the case of the devices of FIGS. 1, 2 and 3, a final value must written for each data packet into the memory 16, while a starting value must be retrieved from the memory. In the given example, the length of these values is 256 bits. In the case of very high data rates, such as required in the case of ATM, the timely transfer of the respective starting and final values in the above mentioned embodiments can take place only if very wide data paths (for example, data bus 17) are used, which makes the device relatively expensive. In principle, it is possible to reduce the length of the values, but this also reduces the cryptographic security. According to a further aspect of the present invention, therefore, different embodiments are provided which make it possible to transfer, even at very high data rates, starting and final values comprising a large number of bits and therefore offering a high cryptographic security.

First, the data bus 17 can be split into two separate data buses 171 and 172 (not shown), the first data bus 171 being connected to the memory 16 and the first cryptographic element 11, while the second data bus 172 is connected to the memory 16 and the second cryptographic element 12. As a result, it is possible to exchange, simultaneously, information between the memory 16 and the element 11, on the one hand, and the memory 16 and the element 12, on the other. For this purpose, the memory 16 is advantageously constructed so that writing into a first section and reading out from a second section can occur simultaneously. In particular, the memory 16 may be designed for copying information from the second to the first section, so that final values written earlier into the second section can simultaneously be read out from the first section and new final values can be written into the second section.

Second, the registers R1 and R2 of the elements 11 and 12 can be constructed in duplicate, so that in addition to storing a value on which an operation is being carried out at that instant, each register can also store a subsequent value. This will be explained in greater detail below by reference to FIG. 4.

Third, the device can be constructed so that the registers R1 and R2 can exchange their respective content simply and quickly, for example as a result of the presence of a sufficiently wide data path (data bus) between the registers. This is advantageous, in particular, if two successive data packets to be processed belong to the same channel. For this exchange, the elements 11 and 12 can advantageously be constructed in integrated form so that the registers R1 and R2 are arranged in parallel and at a short distance from one another.

Fourth, the device can be constructed so that the function of the cryptographic elements 11 and 12 can interchange. This will be explained in greater detail by reference to FIG. 4. This, too, is advantageous, in particular, if two successive data packets to be processed belong to the same channel. In this case, the content of the register R2 no longer has to be transferred to the register R1 since R2 takes over the function of R1 as a result of the exchange. In such an embodiment, the cryptographic functions F1 and F2 will generally be identical.

Fifth, the processing means may be designed for forming the starting value based on a data packet other than the last data packet (of the channel concerned), as already stated above. By "passing over" a data packet in the sense of not using the data packet for forming a starting value, time is gained for writing and reading out information (such as starting and final values). The disadvantage of this method is that more data packets will be incorrectly decrypted in the event of a packet loss, that is non-arrival or deformed arrival of a data packet at the receiving end.

Furthermore, according to the non-prepublished Dutch Patent Application NL-A-93,0 1841, the device may be provided with a plurality of parallel processing means. As a result, a very high processing rate can be achieved, since a plurality of data packets can be processed simultaneously (or virtually simultaneously). Dutch Patent Application NL-A-93,0 1841 is hereby incorporated by reference in this text.

Figure 4:
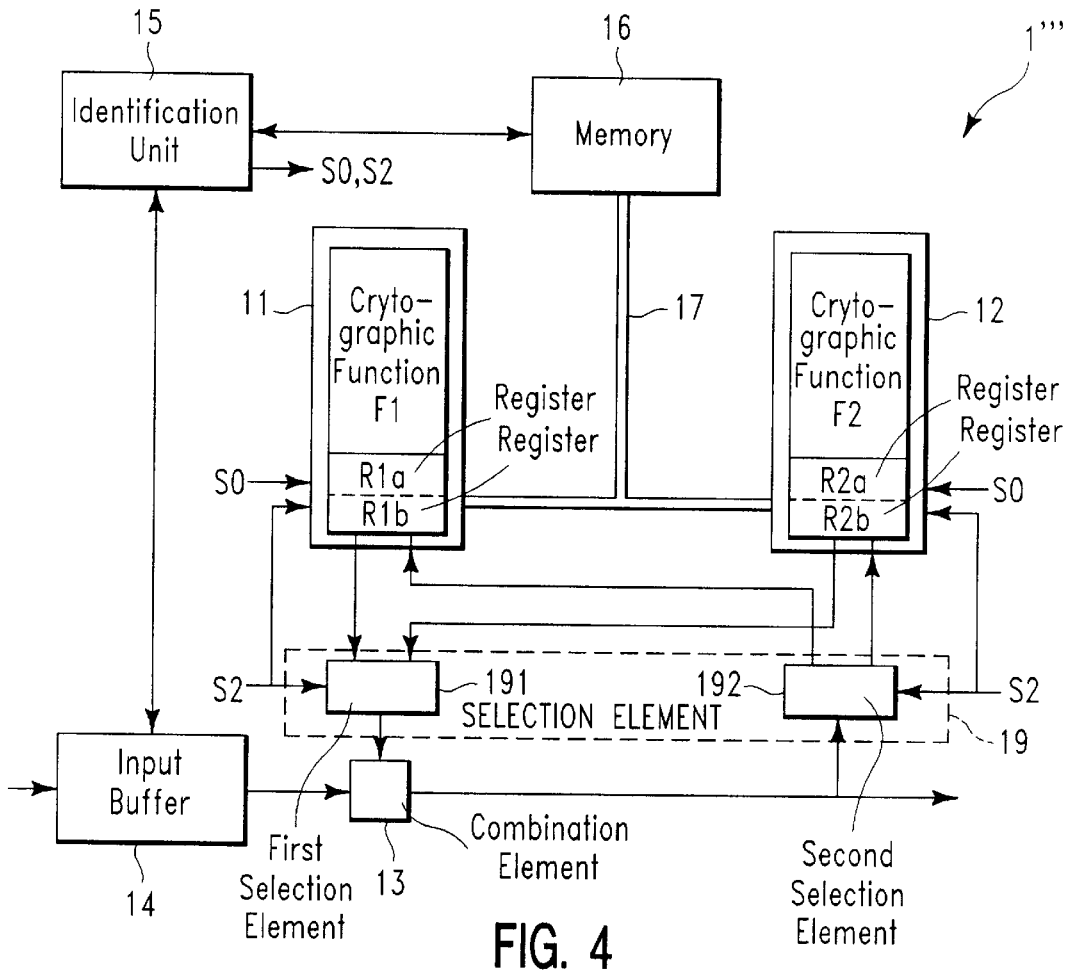
FIG. 4 shows diagrammatically a fourth embodiment of the device according to the invention.

The encrypting device 1''' according to the invention shown in FIG. 4 is constructed so that a very high processing rate can be achieved even with relatively long starting and final values, however without constructing a plurality of the processing means. The device 1''' of FIG. 4 largely corresponds to the device 1 of FIG. 1, but the processing means are additionally provided with selection means 19, which comprise a first selection element 191 and a second selection element 192. In addition, the registers R1 and R2 in FIG. 4 are constructed in duplicate, as will be explained in greater detail later.

The selection means 19 offer the possibility of interchanging the functions of the cryptographic elements 11 and 12. For this purpose a first input of the selection element 191 is connected to the register R1 and a second input to the register R2, while the output is connected to the combination element 13. A selection signal S2, which connects either the register R1 or the register R2 to the combination element 13, can be supplied to a control input of the selection element 191. In a comparable way, the input of the selection element 192 is connected to the output of the combination element 13 and the outputs of the selection element 192 are connected to the register R1 and the register R2, respectively. The output of the combination element 13 can be connected either to the register R1 or to the register R2 by supplying a selection signal S2 to a control input. Depending on the selection signal S2, the operation of the device of FIG. 4 will therefore, in a first mode, correspond completely with that of FIG. 1. In a second mode, the cryptographic elements are functionally interchanged with respect to FIG. 1, so that the function F1 determines the starting value of the function F2 and the final value of the function F2 is supplied to the data to be processed. The selection signal S2 may be generated in the identification unit 15 or in a separate control unit (not shown). Preferably, the selection signal S2, or a signal related thereto, is also supplied to the cryptographic elements 11 and 12 and to the memory 16 in order to ensure that the correct information (such as starting and final values and keys) is transferred to the correct element.

The functional interchange of the cryptographic elements permits, in the case of data packets of the same channel which are to be processed successively, the final value of one function (for example F1) to be supplied rapidly as starting value to the other function (for example F2). No transfer of the value from one register (for example R1) to the other register (for example R2) therefore needs to occur. As a result, very large values, that is, having a large bit length and therefore having a high cryptographic security, can be used.

If two successive data packets belong to different channels, in most applications, the final value of one function (for example F2) cannot directly be used as starting value by the other function (for example, F1) so that the final value must be stored. In order to avoid delay as a consequence of congestion on the data bus 17 or limited access times of the memory 16, the device of FIG. 4 is provided with double registers, which offer the possibility of temporarily storing a second value. For this purpose, the register R1 comprises a section R1a and a section R1b, both sections preferably being capable of containing an entire starting or final value (in the above example, 256 bits). The register R2 likewise comprises a section R2a and a section R2b. If, for example, the device is now operating in the first mode (according to FIG. 1) and two successive data packets belong to different channels, a final value which has to be stored in the memory 16 will be present in the register R2, for example in the section R2a, after the encrypting of the first packet. At very high data rates, the time between two data packets may be insufficient to transfer the, for example, 256 bits of the value to the memory 16. For this reason, in the embodiment of FIG. 4, the content of one register section (for example R2a) can be copied to the other register section (for example, R2b). This releases one register (R2a) for receiving and processing fresh data, while the final value determined can be transferred from the other section (R2b) to the memory 16. As a result, the transfer via the data bus 17 and the determination of a fresh value can occur simultaneously. As an alternative to copying from one register section to the other register section, the operation elements can be constructed so that the register sections are alternatingly connected to the corresponding function (F1 or F2) or to the data bus 17 and the inputs and outputs of the respective cryptographic elements. For this purpose, like the selection means 19 shown in FIG. 4, internal selection means may be provided for the processing means.

It will be clear that the additional measures shown in FIG. 4 can also be used separately, for example by constructing the registers R1 and R2 in duplicate without carrying out a functional interchange of the elements 11 and 12. Characteristics of the device 1''' of FIG. 4 may also be combined with, for example, the device 1'' of FIG. 3.

Figure 5:
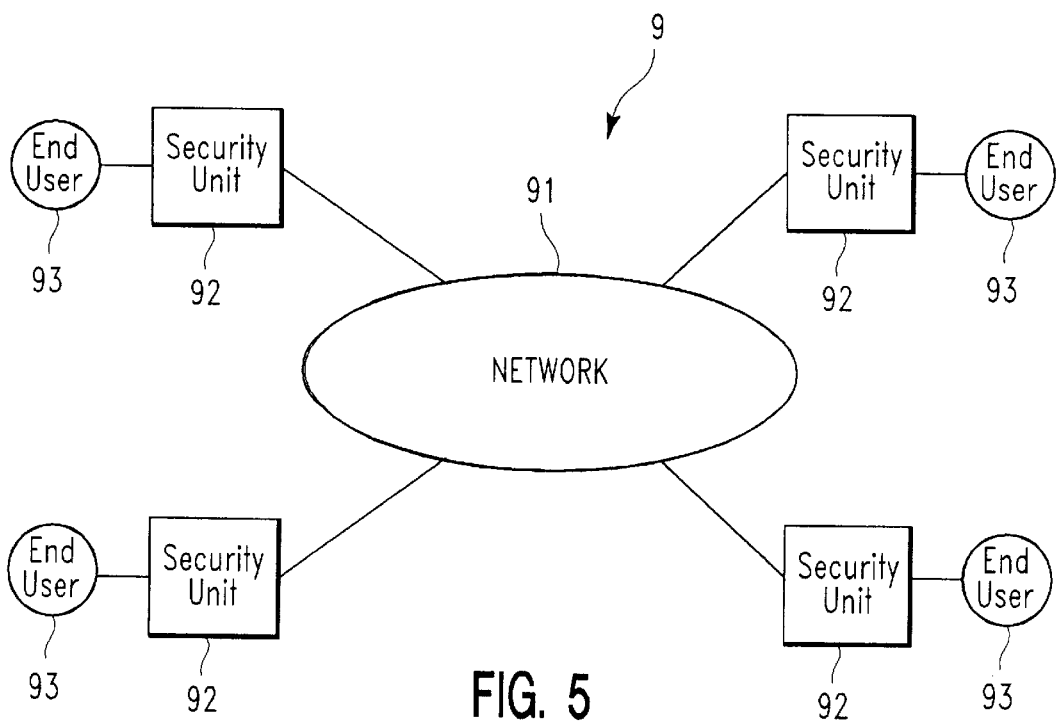
FIG. 5 shows diagrammatically a system for the encrypted transfer of data packets, in which the invention is used.

The communication system 9 shown in FIG. 5 comprises a network 91, to which a plurality of security units 92 are connected. An end user 93 is connected to each security unit 92. The network 91 is, for example, an ATM network and the end users 93 are, for example, digital telephone sets, data terminals and/or payment terminals. Each security unit 92 comprises at least one encrypting device 1 and one decrypting device 1' according to the invention, or a combined device 1'' as shown in FIG. 3, a device 1''' as shown in FIG. 4, or another embodiment of the device according to the present invention. The system 9 constructed in accordance with the invention permits a rapid, secure transfer of data packets.

It will be understood by those skilled in the art that the invention is not limited to the exemplary embodiments shown and that many modifications and additions are possible without departing from the spirit and scope of the present invention.

What is claimed is:

1. Device for cryptographically processing a sequence of data packets, the device comprising:

buffer means for temporarily storing the data packets;

memory means for storing cryptographic information;

identification means for identifying the data packets to form a packet identification and for addressing, based on the packet identification, at least a portion of the cryptographic information stored in the memory means; and processing means for cryptographically processing the data packets based on the cryptographic information stored in the memory means and addressed by the identification means, wherein said processing means comprise a first and a second cryptographic element, said first cryptographic element being designed for generating, on the basis of a first starting vector, processing data for the cryptographic processing of a data packet of the sequence of data packets to be encrypted, and said second cryptographic element being designed for generating, on the basis of a second starting vector, said first starting vector, and said processing means are designed for forming said second starting vector on the basis of a cryptographically processed data packet which precedes the data packet of the sequence of data packets.

2. Device according to claim 1, wherein said processing means are designed for encrypting data packets.

3. Device according to claim 1, wherein said processing means are designed for decrypting data packets.

4. Device according to claim 1, wherein said processing means are designed for selecting between encrypting and decrypting data packets.

5. Device according to claim 1, designed for processing data packets from different logical channels and for storing a key and first starting value for each of said channels in said memory means.

6. Device according to claim 1, wherein said processing means comprise a combination element for combining processing data with data of data packets to be processed.

7. Device according to claim 6, wherein said combination element comprises a modulo-2 adder.

8. Device according to claim 1, wherein said first cryptographic element and said second cryptographic element are designed for carrying out identical cryptographic functions.

9. Device according to claim 8, wherein said processing means are designed for interchanging the functions of said first cryptographic element and said second cryptographic element.

10. Device according to claim 1, wherein said processing means are designed for forming said second starting value on the basis of a key and the first eight bytes of a processed data packet.

11. Device according to claim 1, wherein said processing means are designed for directly exchanging values between said cryptographic elements.

12. Device according to claim 1, wherein at least one cryptographic element is provided with plural registers.

13. Device according to claim 12, wherein said registers are designed for copying the content of one register to another register.

14. Device according to claim 1, suitable for processing Asynchronous Transfer Mode cells.

15. Device according to claim 1, accommodated in an integrated circuit.

16. Method of generating cryptographic processing data, said method comprising the steps of:

carrying out a first cryptographic processing on a first starting vector, a final value of said first cryptographic processing being used as processing data for processing a first data segment; and carrying out a second cryptographic processing on a second starting vector, a final value of said second cryptographic processing being used as a first starting vector for said first cryptographic processing when processing a data segment following said first data segment, and said second starting vector being formed on the basis of a key and data which have been combined with the processing data.

17. Communication system for transferring data by means of encrypted data packets, comprising a plurality of devices for cryptographically processing a sequence of data packets, said devices comprising:

buffer means for temporarily storing the data packets;

memory means for storing cryptographic information;

identification means for identifying the data packets to form a packet identification and for addressing, based on the packet identification, at least a portion of the cryptographic information stored in the memory means; and processing means for cryptographically processing the data packets based on the cryptographic information stored in the memory means, which cryptographic information is addressed by the identification means, wherein said processing means comprise a first and a second cryptographic element, said first cryptographic element being designed for generating, on the basis of a first starting vector, processing data for the cryptographic processing of a data packet of the sequence of data packets, and said second cryptographic element being designed for generating, on the basis of a second starting vector, said first starting vector, and said processing means are designed for forming said second starting vector on the basis of a cryptographically processed data packet which precedes the data packet of the sequence of data packets.

18. System according to claim 17, wherein said processing means are designed for encrypting data packets.

19. System according to claim 17, wherein said processing means are designed for decrypting data packets.

20. System according to claim 17, wherein said processing means are designed for selecting between encrypting and decrypting data packets.

21. System according to claim 17, designed for processing data packets from different logical channels and for storing a key and a first starting value for each of said channels in said memory means.

22. System according to claim 17, designed for transferring data packets in accordance with the asynchronous transfer mode (ATM).

23. A method for cryptographically processing a first data packet and for subsequently cryptographically processing a second data packet, the method comprising steps of:

a) buffering the first data packet;

b) identifying the first data packet to generate a packet identification value;

c) addressing, based on the packet identification value, stored cryptographic information;

d) applying, as a first starting vector, the cryptographic information to a first encryption device to generate processing data;

e) encrypting the first data packet based on the processing data to generate a first output;

f) generating a second starting vector based on at least a portion of the first output;

g) applying the second starting vector to a second encryption device to generate new cryptographic information;

h) applying the new cryptographic information, as another first starting vector, to the first encryption device to generate new processing data; and i) encrypting the second data packet based on the new processing data to generate a second output.

24. The method of claim 23 wherein the step of generating a second starting vector based on at least a portion of the first output includes sub-steps of:

i) copying a portion of the first output to form a first value; and ii) adding a pre-determined value to the first value to generate the second starting vector.

25. The method of claim 24 wherein the first value is formed by generating four copies of a first eight bytes of the first output.

26. A method for cryptographically processing a first data packet and for subsequently cryptographically processing a second data packet, the method comprising steps of:

a) applying, as a first starting vector, cryptographic information to a first encryption device to generate processing data;

b) encrypting the first data packet based on the processing data to generate a first output;

c) generating a second starting vector based on at least a portion of the first output;

d) applying the second starting vector to a second encryption device to generate new cryptographic information;

e) applying the new cryptographic information, as another first starting vector, to the first encryption device to generate new processing data; and f) encrypting the second data packet based on the new processing data to generate a second output.

27. An apparatus for cryptographically processing a first data packet and a second data packet, the device comprising:

a) a first cryptographic processing unit having an input and an output;

b) an encryption element having a first input for receiving the first and second data packets, a second input coupled with the output of the first cryptographic processing unit, and an output; and c) a second cryptographic processing unit having an input for receiving at least a part of an encrypted data packet provided at the output of the encryption element, and an output coupled with the input of the first cryptographic processing unit, wherein the first cryptographic processing unit is adapted to (i) receive, at its input, cryptographic information, as a first starting vector, and (ii) in response, provide processing data at its output, wherein the encryption element is adapted to (i) receive, at its first input, the first data packet, and (ii) encrypt the first data packet based on the processing data to generate a first output value, wherein a second starting vector is generated based on at least a portion of the first output value, wherein the second cryptographic processing unit is adapted to (i) receive, at its input, the second starting vector, and (ii) in response, provide, at its output, new cryptographic information, wherein the first cryptographic processing unit is adapted to (i) receive, at its input, the new cryptographic information as another first starting vector, and (ii) in response, provide new processing data at its output, and wherein the encryption element is adapted to (i) receive, at its input, the second data packet, and to provide, at its output, a second output value which is based on the new processing data.

* * * * *